United States Patent

Doolittle et al.

[11] 4,089,114
[45] May 16, 1978

[54] CUTTING DEVICE

[75] Inventors: Stephen Dale Doolittle, Rock Hill, S.C.; Lynn David Lineback, Danville, Va.; Charles Franklin Sherrill, Danville, Va.; Willie Lonnie Stanfield, Jr., Danville, Va.; Kelvin Howard Wildman, Danville, Va.

[73] Assignee: Disston, Inc., Pittsburgh, Pa.

[21] Appl. No.: 802,956

[22] Filed: Jun. 2, 1977

Related U.S. Application Data

[63] Continuation-in-part of Ser. No. 719,340, Aug. 31, 1976, abandoned.

[51] Int. Cl.² .......................... A01D 35/26; A01G 3/06
[52] U.S. Cl. ........................................... 30/276; 56/12.7; 30/DIG. 1; 30/122
[58] Field of Search ................... 30/276, 347, DIG. 1, 30/122, 336; 56/12.7, 295

[56] References Cited

U.S. PATENT DOCUMENTS

| | | | |
|---|---|---|---|
| 3,183,538 | 5/1965 | Hubner | 30/DIG. 1 |
| 3,343,351 | 9/1967 | Freedlander | 56/295 |
| 3,349,451 | 10/1967 | Maeno | 24/208 A |
| 3,555,798 | 1/1971 | Eder | 56/295 |
| 3,670,413 | 6/1972 | Weber | 30/276 |
| 3,877,146 | 4/1975 | Pittinger | 30/347 X |
| 3,895,440 | 7/1975 | Pittinger, Jr. | 30/347 |

*Primary Examiner*—Jimmy C. Peters
*Attorney, Agent, or Firm*—B. B. Olive

[57] ABSTRACT

A cordless electric lawn edger utilizes a flexible strand of nylon monofilament rotated at high speed to effect cutting of grass and weeds. The rotating assembly mounting the strand is substantially conical in order to reduce drag and prevent grass from wrapping around the assembly. The strand is fixedly secured within a detachable and disposable tip member which easily snapfits into a rotatable truncated cone member. The cone member is, in turn, secured to the drive shaft of a DC motor. The edger is provided with both a grip handle and a loop handle arranged for optimum tool balance and handling.

6 Claims, 23 Drawing Figures

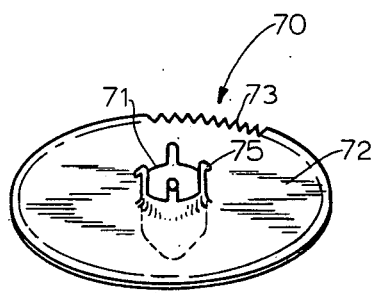
FIG. 16
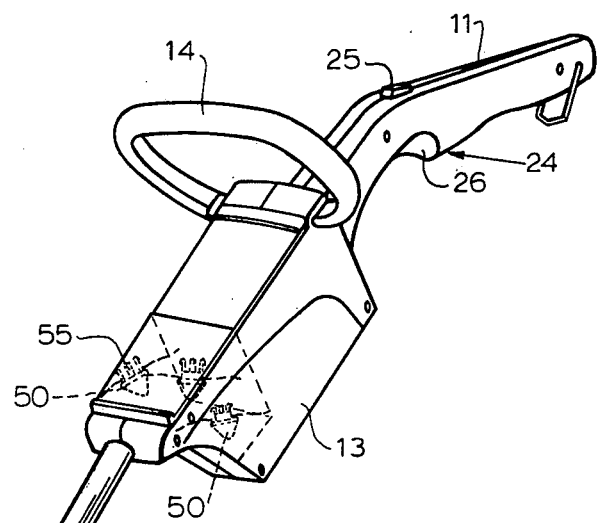
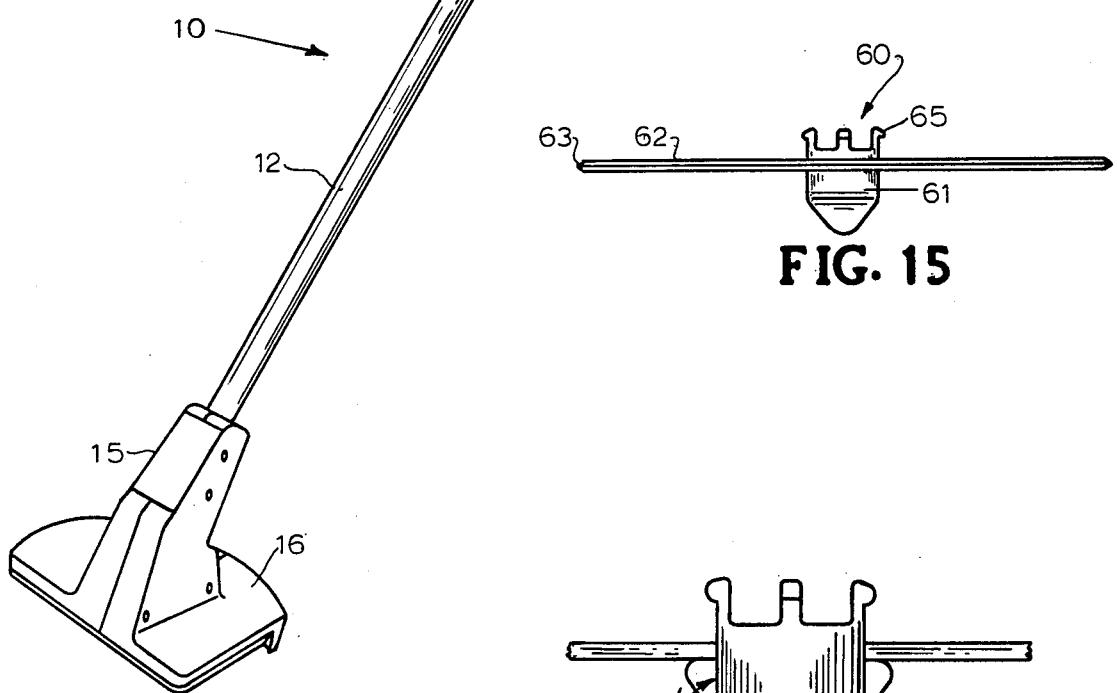
FIG. 1
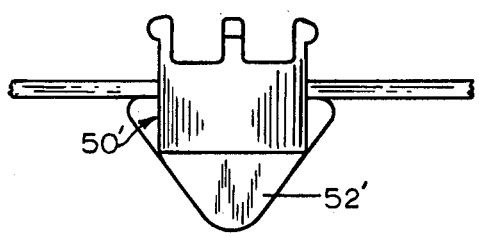
FIG. 15
FIG. 14

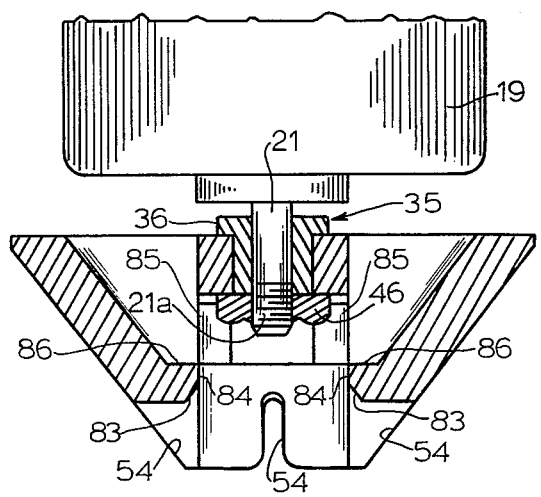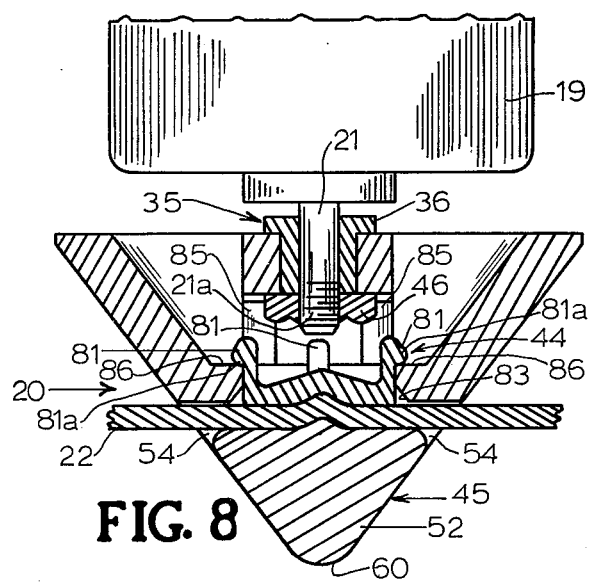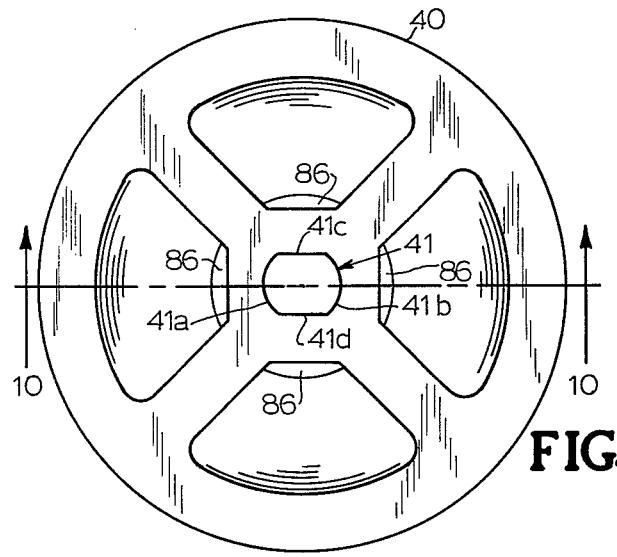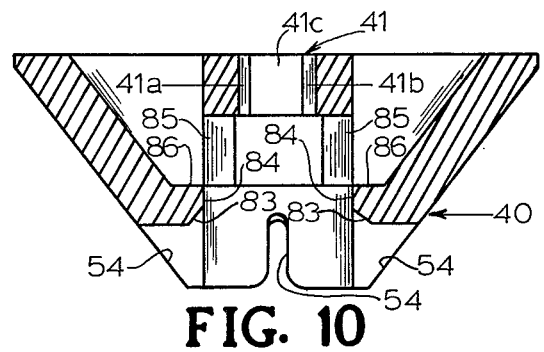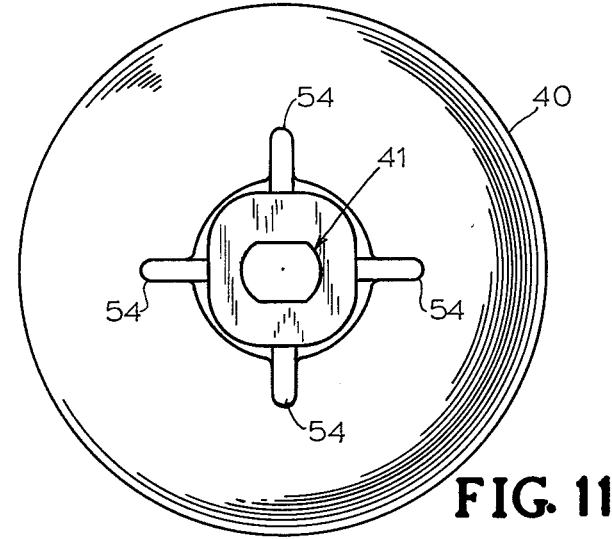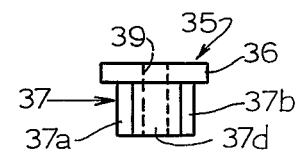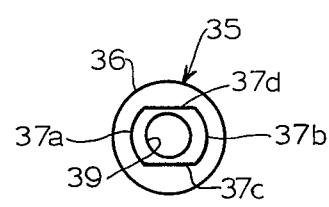

CUTTING DEVICE

CROSS-REFERENCE TO RELATED APPLICATION

This application is a continuation-in-part of abandoned application Ser. No. 719,340, filed Aug. 31, 1976, entitled "Cutting Device" and which is assigned to the same assignee.

BACKGROUND OF THE INVENTION

1. Field of the Invention:

The invention relates to lawn trimmers of the type utilizing flexible strands rotated at high speed as the cutting element. In particular, the invention relates to cordless electric lawn edgers having a detachable and disposable tip for retaining the strand and positioning the strand in an operative cutting position.

2. Description of the Prior Art:

It is well known that conventional wide-swath lawn mowers (e.g., 16 to 36 inches) are unable to cut grass and weeds near trees and buildings and adjacent sidewalks. Thus, the homeowner must trim these areas by other means in order to maintain a neat lawn. Edgers for this task have included hand-operated scissorlike trimmers as well as portable cordless electric shears such as disclosed in U.S. Pat. No. 3,623,223.

It has long been known that non-woody vegetable tissues may be cut or separated by striking them rapidly with edges of planar objects such as sickles and scythes. If the speed is sufficiently high, fairly blunt edges such as those found on rotary lawn mowers may be used. Recently, it has been determined that a blunt flexible cord or strand could be used to effect such cutting. This principle has been applied in the lawn edging art whereby a flexible filament or strand is rotated to effect cutting. With such rotating strand devices, most of the cutting is done near the tips of the strands where the speed is highest. Patents illustrative of such flexible filament lawn edgers include U.S. Pat. Nos. 3,708,967; 3,831,278; 3,892,037 and 3,895,440.

A major obstacle encountered with prior art strand lawn edgers is the replacement of the strand when it becomes worn due to contact with trees, concrete, or the like. One approach has been to provide a supply of filament within the device and continually feeding or "paying out" the line as it is shortened through wear. This solution not only involves complicated and costly filament feed apparatus, but also has the added disadvantage of always presenting a worn or frayed filament end for cutting. Since most of the cutting takes place at the end of the strand where the speed is highest, the frayed strand may greatly decrease the cutting efficiency.

Other filament edgers, such as the edger described in U.S. Pat. No. 3,831,278, utilize a single strand length secured at its center to a rotating member. Two analogous devices are found in U.S. Pat. Nos. 2,663,137 and 3,018,602 wherein wires are secured between parallel rotating plate members to hold the wires in place for cutting. However, these patented devices do not provide a simple means for replacing the strands or wires when they are worn or frayed.

U.S. Pat. Nos. 3,670,413 and 3,877,146 are illustrative of coupling arrangements between rotatable blades and their motor shafts. The groove approach in U.S. Pat. No. 3,670,413 allows slippage of the blade relative to the motor shaft and would be detrimental to the functioning of the tool of this invention.

Prior to the present invention, applicants were aware of no commercially available cordless electric strand cutting device. This is due primarily to the fact that the prior art devices have high power requirements not compatible with a rechargeable battery power source. The motors of the known devices generally must rotate a relatively high mass which in some cases includes a supply of line that is payed out as the line wears. In other cases, the power requirements are increased because of the drag produced between the rotating elements and the grass as well as a tendency for the grass to wrap around such elements. Because of the availability of relatively high power AC motors for use on the AC trimmers of the prior art, the designers of such trimmers have not adequately dealt with the problem of reducing power drain.

Thus, it becomes an object of the present invention to provide a cordless electric flexible strand cutting device having a rotating strand mounting assembly which places a minimum load on the DC motor so as to be compatible with a rechargeable battery source of power and adapted to being plastic molded.

Another object of the invention is to provide a simple and inexpensive means for assuring that a fresh and unfrayed strand is always exposed for maximum cutting efficiency. In particular, it becomes an object to provide a detachable and disposable tip member incorporating a cutting strand and which may be easily replaced when the strand becomes shortened or frayed due to wear.

Another object of the invention is to provide an upright cordless electric strand lawn edger having both a grip handle and a loop handle positioned for optimum tool balance and handling.

SUMMARY OF THE INVENTION

The apparatus of the present invention provides a novel conical rotating cutting assembly for a flexible strand grass trimmer. The novel assembly includes a truncated cone member which is secured to the motor drive shaft so that the cone and shaft are rotatable together in a non-slipping relationship. A small replaceable tip member incorporating the cutting strand is secured to the bottom of the cone member by a snap-fit connection and rotates therewith. A strand is held fixed between upper and lower ultrasonically welded pieces of the tip so that is extends approximately three inches on each side of the tip. The tip is preferably molded of lightweight plastic material and is detachable and disposable and is replaced when the strand becomes worn or frayed. A detachable cutting disc, saw or blade may also be employed and be integrally molded of lightweight plastic.

Other aspects of the invention include excellent tool handling capabilities provided by a pair of handles, one a grip handle at the top of the vertical tool shaft and the other a loop handle located somewhat lower on the shaft. The conical shape of the cutting assembly greatly reduces drag caused by contact with the grass and prevents grass from wrapping around the assembly or the drive shaft. The shape of the cutting assembly and its low mass reduces the load on the motor and makes the tool compatible with a rechargeable battery power supply

DESCRIPTION OF THE DRAWINGS

FIG. 1 is a perspective view of the flexible strand lawn edger of the invention.

FIG. 7 is an enlarged, fragmentary, section view of the cone, drive shaft motor in assembled relation.

FIG. 8 is a view similar to that of FIG. 7 but with the tip member in section and snap-fitted in the cone ready for use.

FIG. 9 is a plan view of the cone member.

FIG. 10 is a section view taken along line 10—10 of FIG. 9.

FIG. 11 is a bottom view of the cone member of FIGS. 9 and 10.

FIG. 12 is a side, elevation view of a cone sleeve employed in the present invention.

FIG. 13 is a bottom plan view of the cone sleeve of FIG. 12.

FIG. 14 represents an alternate detachable strand construction.

FIG. 15 represents a detachable cutting disc.

FIG. 16 represents a detachable cutting saw.

DESCRIPTION OF THE PREFERRED EMBODIMENT

Figure 2:
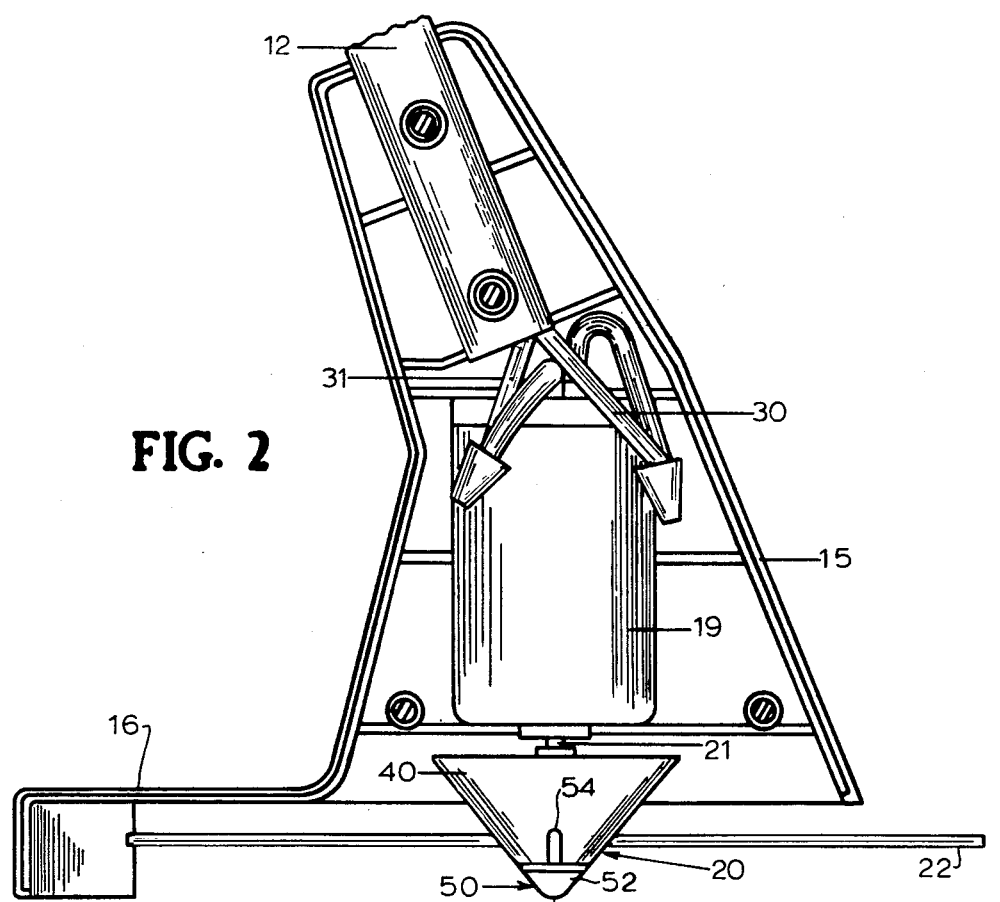
FIG. 2 is an enlarged, fragmentary side view of the motor housing and shroud portion of the edger with the right clam shell housing half removed for purposes of illustration.

Referring to FIG. 1, in a preferred embodiment the upright flexible strand lawn edger 10 comprises a grip handle 11, a tubular shaft 12, a battery housing 13, a loop handle 14, a motor housing 15, and a shroud 16 enclosing a rotating assembly 20. A flexible nylon monofilament strand 22 is secured at its midpoint within the assembly 20 and extends approximately three inches on each side to effect cutting.

The grip handle 11 includes a double acting trigger switch 24 for operator control of the edger. Trigger switch 24 comprises a first safety button 25 which, when depressed, allows the operator to depress trigger 26 to actuate the edger. The operator supports the device in one hand by grip handle 11 and in the other hand by loop handle 14. The handles are, thus, spaced apart to give overall tool balance and excellent control of the tool.

Grip handle 11, loop handle 14, and battery housing 13 are preferably formed together from two clam shell halves secured to the upper portion of shaft 12. Battery housing 13 encloses a rechargeable battery (not shown). Shaft 12 serves to enclose a pair of lead wires 30, 31 connecting the battery to the motor 19. The lower portion of shaft 12 is secured to motor housing 15. A motor 19 is fixedly mounted within housing 15 and is electrically connected to the battery by lead wires 30, 31. As best shown in FIGS. 1 and 2, a shroud 16 is formed as an integral continuation of motor housing 15. Housing 15 and shroud 16 are also made from mating clam shell halves.

Figure 3:
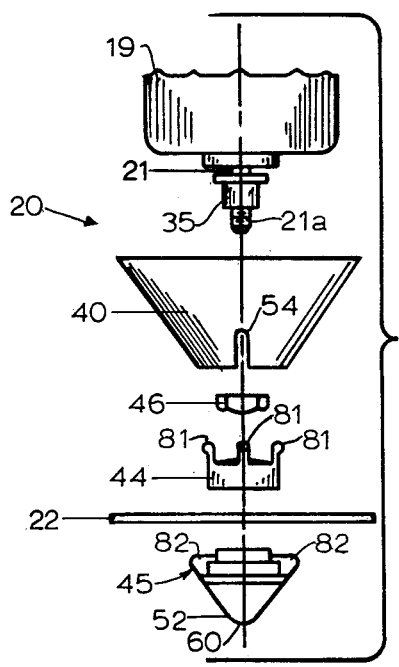
FIG. 3 is an exploded side view of the lower portion of the motor and drive shaft and the substantially conical rotating assembly of the invention.

Rotating assembly 20 (see FIGS. 2, 3 and 8), comprises a truncated cone portion 40 and a replaceable tip portion 50. Cone portion 40 is secured to shaft 21 of motor 19 in the following manner. Cone portion 40 slidably mounts on sleeve 35 which has been pressed onto shaft 21 so that sleeve 35 rotates with shaft 21. Sleeve 35 has a rounded head portion 36 which resides in a noncontacting relation adjacent the bottom of motor 19. Elongated portion 37 is of somewhat rectangular cross section and has a pair of opposed round walls 37a, 37b and a pair of opposed flat walls 37c, 37d (see FIGS. 12 and 13). As cone 40 is slid onto shaft 21, walls 37a, 37b, 37c, and 37d align with and are received by bore 41 which is of the same internal shape as portions 37a, 37b, 37c and 37d. Bore 41 is integrally formed in cone 40 as best seen in FIG. 10 with round walls 41a, 41b and flat walls 41c, 41d. Walls 37a, 37b, 37c, 37d mate respectively with walls 41a, 41b, 41c, 41d. Shaft 21 has a threaded end portion 21a which once cone portion 40 is slid onto sleeve 35 receives a threaded "palnut" 46. Palnut 46 is tightened in a direction counter to the direction of rotation of motor 19 thereby preventing spin-off once motor 19 is energized. The threads of the shaft threaded end portion 21a are oriented accordingly. The substantially conical shape of assembly 20 prevents the wrapping of grass and weeds around drive shaft 21 and also serves to present a longer segment of strand 22 than would be otherwise presented with a cylinder, for example.

Strand-bearing tip member 50 comprises an assembly of a top strand retainer 44, bottom strand retainer 45 and strand 22. Strand 22 is held secured in place in a small opening 47 between top and bottom strand retainers 44, 45. Opening 47 is formed by the mating of a groove 48 in top retainer 44 and a knob 49 in bottom retainer 45. Retainers 44, 45 are designed to fit together with strand 22 securely held in place between groove 48 and knob 49. Retainers 44, 45 are then ultrasonically welded into an inseparable strand-bearing tip member 50 which, after wear, can be treated as a disposable item.

Figure 23:
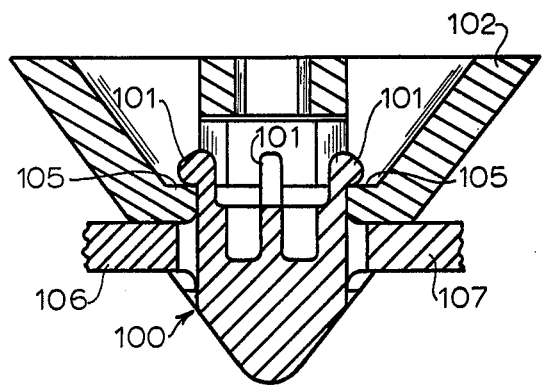
FIG. 23 is a section view through the alternative embodiment cone and blade construction in assembled relation.

In operation, tip member 50 is detachably secured by snap-fit to truncated cone section 40, as previously mentioned. Tab extension 52 completes the conical contour. Tip member 50 has four flexible fingers 81 which during snap-fitting are aligned opposite slots 54 in section 40. At the same time the pair of slot tabs 82 and the central outwardly extending portions of strand 22 are aligned opposite and loosely seated in two of the opposing slots 54 as tip member 50 becomes fully installed in cone 40. When tip member 50 and cone member 40 are snap-fitted together, strand 22 projects radially from truncated cone 40 through two of the opposing slots 54 at a position approximately one-third up from the lower surface of the cone. Member 50 is forced inward into cone 40 during which the four fingers 81 are first compressed slightly by tapered surfaces 83, are held compressed by inner wall 84 as member 50 moves inwardly and then as the four enlarged portions 81a of fingers 81 go past ledges 86, fingers 81 are allowed to extend through four openings 85 in cone 40 and snap outwardly over ledges 86 as seen in FIGS. 8 and 23. A particular advantage of this arrangement is the fact that centrifugal force tends to further tighten the snap joint when the tool is running. Once fingers 81 are snap-locked in position as described, tip member 50 and consequently strand 22 are rigidly but detachably locked within cone section 40 and together form the assembly 20 which is secured to and rotates with shaft 21.

Once worn, the disposable tip member 50 can be easily replaced by manually grasping and pulling on strand 22 which causes fingers 81 to dislodge from ledges 86 and tip member 50 to be released from cone 40. Thus, no tools are necessary for changing of tip member 50. A new tip member 50 can now be snap-fitted into cone member 40 in the manner previously described.

For convenience, a number of replacement strand-bearing tips 50 may be stored in a holding pocket 55 located in the battery housing 13 (FIG. 1). It should be noted that when tip 50 is snapped into truncated cone 40, the extension 52 forms a continuation of the cone in one plane thereby defining the apex 60 of the cone. When the device is cutting, truncated cone 40 and extension 52 present a substantially complete cone to the grass which reduces drag and prevents grass from wrapping around the device.

In the specific embodiment, strand 22 is a nylon monofilament having a diameter of 0.0625 inch. The specific strand 22 is slightly more than six inches long and extends approximately three inches on each side of cone assembly 20. A range of strand lengths to be used according to the present invention is five to eight inches. Motor 19 is preferably a six-volt DC motor designed so that with cone assembly 20 attached to drive shaft 19, it will free run at approximately 11,000 rpm. The tip speed of strand 22 at such free run is approximately 288 feet per second and the input power to motor 19 is approximately 48 watts. During operation for the cutting of heavy grass, the power input increases only slightly to approximately 54 watts. With the preferred rechargeable battery having approximately a ten amp-hour rating, an operating time of approximately thirty minutes may be expected between battery recharges. It will be appreciated that the power input to motor 19 has been minimized by the lightweight and compact rotating assembly 20 in order to minimize the drain on the rechargeable battery. Assembly 20 may be molded of lightweight plastic.

Figure 4:
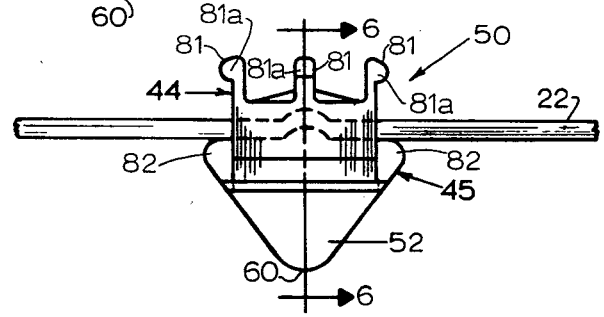
FIG. 4 is a side view of the strand-bearing tip member showing the flexible cutting strand deformed at its midpoint and secured at the interface between the top and bottom strand retainers which are ultrasonically welded together.
Figure 5:
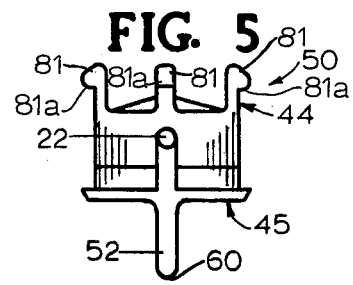
FIG. 5 is a side view of the tip member in FIG. 4.
Figure 6:
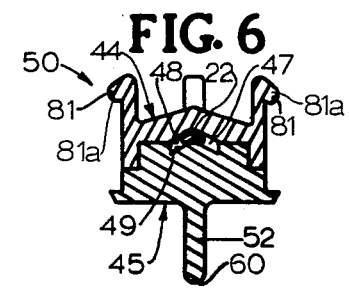
FIG. 6 is a section view of the tip member taken substantially along line 6—6 of FIG. 4 and showing the cooperative groove and knob means for retaining the strand once the top and bottom retainers are ultrasonically welded together.
Figure 17:
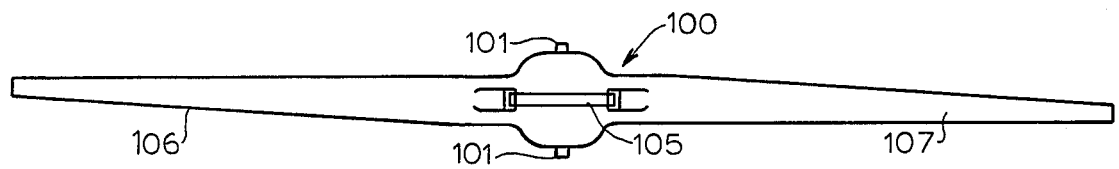
FIG. 17 is a bottom plan view of an alternate embodiment detachable blade construction.
Figure 18:
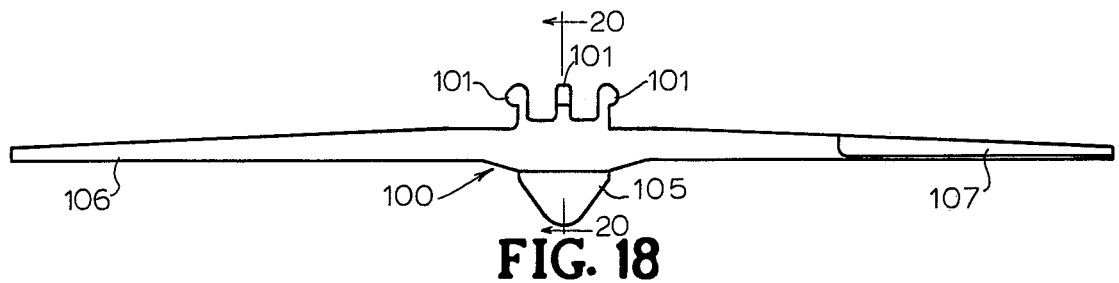
FIG. 18 is a side elevation view of the FIG. 17 detachable blade construction.
Figure 19:
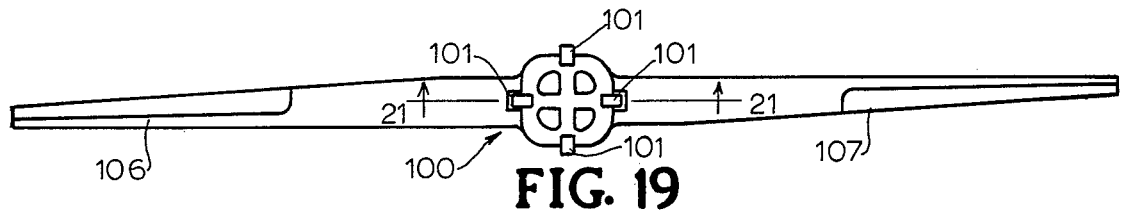
FIG. 19 is a top view of the blade construction of FIGS. 17 and 18.
Figure 20:
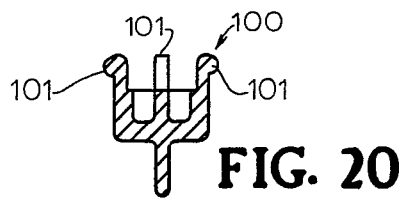
FIG. 20 is a section view along line 20—20 of FIG. 18.
Figure 21:
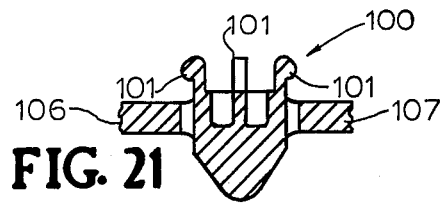
FIG. 21 is a fragmentary section view along line 21—21 of FIG. 19.
Figure 22:
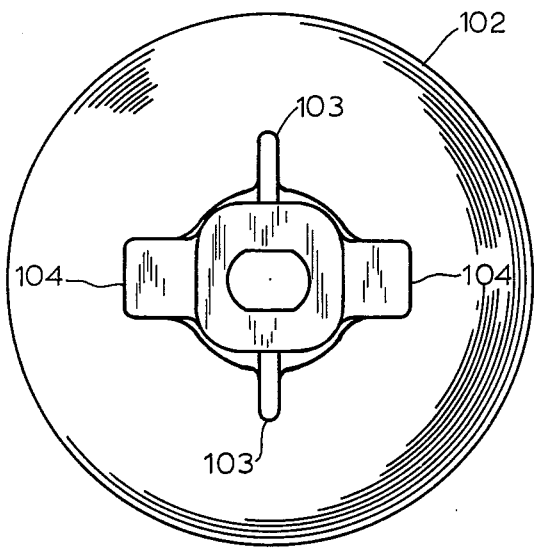
FIG. 22 is a bottom view of an alternative embodiment cone member.

Also encompassed within the scope of the invention is the concept of molding tip member 50 as an integral tip member 50' with an integral extension 52' as illustrated in FIG. 14. That is, in the embodiment of FIG. 14, the snap-fit feature is retained and retainers 44, 45 and strand 22 shown in FIGS. 4-6 are molded as an integral structure of suitable lightweight plastic.

While only one cutting attachment has been illustrated, it should be noted that without departing from the scope of the present invention the snap-on tip member may be modified to carry various other cutting attachments which may be used for cutting heavier growth or for other applications. Other cutting attachments may include, for example, as seen in FIG. 15 an integral molded cutting disc 60, having a detachable hub 61, a disc portion 62, a beveled cutting edge 63 and resilient fingers 65, comparable to fingers 81 in FIG. 4, and of suitable length to allow the same snap-fit connection previously explained. In another embodiment an integral molded circular saw 70 shown in FIG. 16 includes a detachable hub 71, a disc portion 72, a toothed edge 73 and a similar set of snap-fit fingers 75. Thus, the disc of FIG. 15 or the saw of FIG. 16 may be snap-fitted to the cone 40 in the same manner as tip member 50 as previously explained. Such alternative cutting attachments may, in some instances, require special shrouds or guards, but may be interchangeable with the snap-on flexible strand tip member of the preferred embodiment. Furthermore, the strand bearing tip may be modified to provide a single strand having only one free end extending outwardly from the tip or, in another configuration, the tip may provide two or more strands with each strand having both free ends extending from the tip. Also to be noted is that for some cutting applications, the motor shaft may itself be molded or otherwise formed with the conical section 40 of the invention so that the selected cutting tool may be directly snap-fitted to the motor shaft.

In a still further embodiment, a blade construction 100 is molded as an integral unit with a tip member 105, blades 106, 107 and flexible fingers 101. Fingers 101 function the same as fingers 81 in the preferred embodiment. Blade construction 100 snap-fits within an alternate embodiment cone member 102. Cone member 102 has one pair of opposed slots 103 which serve the same function as slots 54 of cone 40 and are designed to receive the strand portion of tip member 50 as in FIG. 8. Cone member 102 has a second pair of opposed slots 104 which are wider than the slots 103 and which receive the central mounting portion of blade construction 100 in a snap-fit relationship with fingers 101 springing into place over ledges 105 in the manner previously explained. Thus, this alternate cone construction allows for utilization of strand tip 50 or blade assembly 100. Removal of tip member 50 or blade assembly 100 is accomplished as in the preferred embodiment, i.e., grasping of strand 22 or blade assembly 100 and pulling the same from cone member 102. Cone 102 can thus be seen to be similar in construction to cone 40 with the exception of slots 104 and can be attached to drive shaft 21 in the same manner as cone 40.

In summary, it can be seen that the art is now provided with a cordless electric flexible strand lawn edger having an inexpensive and simple strand-bearing tip which may be snap-fitted into place by the operator without the aid of tools and which may be replaced with a new tip when the cutting strand becomes worn or frayed. The novel construction of the rotating assembly attached to the drive shaft allows the cutting strand to be made an integral part of an inexpensive and disposable tip. Furthermore, the substantially conical shape of the rotating assembly serves to reduce drag during operation and thereby make the tool compatible with a rechargeable battery power supply. The various illustrated embodiments also advantageously lend themselves to being molded of various well-known and suitable lightweight plastic materials.

What is claimed is:

1. A tip member for mounting on a rotary member of a strand type cutting device, comprising:
   (a) a length of flexible strand;
   (b) a top strand retainer including finger means for detachable securement to said rotary member by outwardly pressing snap-fit engagement of said finger means with mating slot receiving portions on said rotary member; and
   (c) a bottom strand retainer secured to said top retainer at an interface, said top and bottom retainers having cooperative means at such interface for fixedly holding the midpoint of such strand with the free end portions thereof projecting radially outwardly in a cutting plane substantially normal to the axis of said rotary member.

2. A cordless electric flexible strand cutting device, comprising in combination:
   (a) a tubular shaft;
   (b) a grip handle secured at the upper portion of said tubular shaft;
   (c) a loop handle secured to said tubular shaft at a position below said grip handle;
   (d) a DC motor having a drive shaft;
   (e) a motor housing secured to the lower portion of said tubular shaft and enclosing said motor in an operative attitude with the drive shaft extending substantially downwardly;
   (f) rechargeable battery means;
   (g) a battery housing secured intermediate the length of said shaft and enclosing said battery means;
   (h) means for electrically connecting said battery means to said motor through switch means; and
   (i) an assembly mounted for rotation on said drive shaft and comprising:
      (i) a truncated cone member secured to said drive shaft at the base thereof for rotating the cone member about its central axis, and
      (ii) a detachable and disposable strand-bearing tip member including a flexible cutting strand, said tip member being detachably secured to said cone member by manual snap-fit engagement.

3. In a grass trimmer of the type effecting cutting by a rotating flexible strand and having an upright shaft portion with a handle at the upper shaft end and an electric motor at the lower shaft end and with the motor drive shaft being operatively disposed substantially downwardly, an improved strand mounting assembly comprising a truncated cone member secured to said drive shaft for rotation of the cone member about its central axis, a flexible cutting strand, a tip member having a portion of said strand fixedly secured thereto at an interface between mated, secured top and bottom strand retainer portions of said tip member, and mating slot means on said cone member and finger means on said tip member top strand retainer portion for detachably securing said tip member to said cone member by snap-fit engagement and thereby positioning said strand in a cutting plane normal to said cone central axis, said finger means being adapted to being pressed inwardly initially for said engagement and then outwardly for final securement in said mating cone member slot means thereby enabling centrifugal force to tighten said snap-fit during operation of said trimmer.

4. In a cutting device of the type utilizing a cutting attachment rotating about a substantially vertical axis and having electric motor drive means, an improved structure for mounting the cutting attachment in operative cutting position and for being driven by a shaft of said motor comprising:
   (a) a first mounting member secured to and driven by the motor shaft;
   (b) a second mounting member having at least one cutting attachment fixedly secured thereto; and
   (c) cooperative structural finger and slot means on mating surfaces of said first and second mounting members enabling said second mounting member to be detachably secured by snap-fit to said first mounting member for installation and removal of said attachment, said finger and slot means including a set of flexible finger members on one of said mounting members and a set of mating slots on the other of said mounting members, said finger members being adapted to spring outwardly into said slots to effect said snap-fit engagement and to tighten said snap fit during operation of said device.

5. A device as claimed in claim 4 wherein said cutting attachment comprises a cutting strand.

6. A device as claimed in claim 4 wherein said cutting attachment comprises one of a set of cutting attachments such as strand, saw, disc and blade type cutting attachments charcterized by having a common type of said cooperative structural means.

* * * * *